March 19, 1963 W. D. PRATT 3,082,016
AUTO CART
Filed Sept. 28, 1960
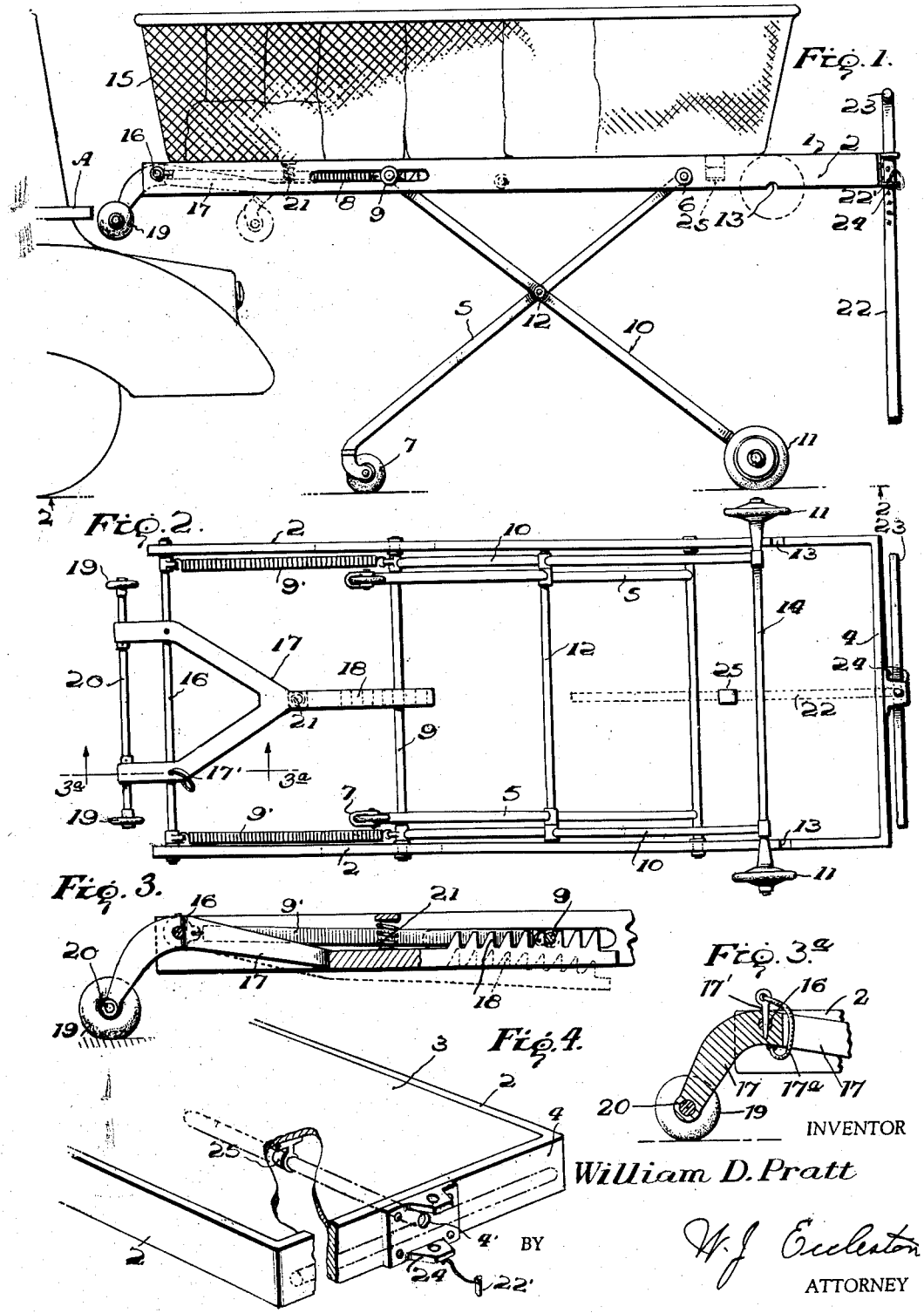
INVENTOR
William D. Pratt
BY
W. J. Eccleston
ATTORNEY 3,082,016
AUTO CART
William D. Pratt, Forest Park, Ga.
(Sharpe Army Depot, Lathrop, Calif.)
Filed Sept. 28, 1960, Ser. No. 59,124
7 Claims. (Cl. 280—36)
(Granted under Title 35, U.S Code (1952), sec. 266)

The invention described herein, if patented, may be manufactured and used by or for the Government for governmental purposes, without payment to me of any royalty thereon.

This invention relates to vehicles or carts such as commonly used in the transportation of groceries selected in a supermarket or the like to an automobile for final conveyance to the purchaser's home.

A primary object of the invention consists in providing such a vehicle in which the wheels may be readily retracted, even when loaded, so that the vehicle may be stored in the back of a station wagon, or in the trunk of a conventional sedan.

A further object of the invention resides in the construction of such a vehicle which may be operated by a single individual, so as to retract the wheels and then roll the vehicle into the back of the station wagon or the trunk of a sedan to fully clear the tail gate or the trunk closure of the vehicle.

Other objects and advantages of the invention will be apparent from the following description taken in connection with the accompanying drawings, in which:

FIGURE 1 is a side elevational view of the cart about to have its wheels retracted and rolled into the rear of a vehicle; the retracted position being indicated in dotted outline;

FIGURE 2 is a bottom plan view of the cart, as shown in FIGURE 1, looking in the direction of the arrows 2;

FIGURE 3 is an enlarged fragmentary detail view, partly in section, showing the wheel-locking device released in dotted lines;

FIGURE 3a is an enlarged fragmentary longitudinal section taken substantially along the line 3a—3a of FIGURE 2, looking in the direction of the arrows;

FIGURE 4 is a fragmentary perspective view of the body of the cart with parts broken away to more clearly show the storage position of its handle.

Referring to the drawings in greater detail, and especially to FIG. 1, the body of the cart is indicated generally by the numeral 1 and includes side walls 2, upper surface 3, and end wall 4. The side walls 2 serve as supports for a scissor-type retractable running gear which includes a pair of legs 5 pivoted to the side walls 2, as indicated by the numeral 6, and carrying at their lower ends a pair of swivelly mounted casters 7. Slidably mounted in slots 8 adjacent the forward ends of the side walls 2 is a rod 9 fixed to the upper end of another pair of legs 10, which carry at their lower ends a pair of wheels 11. The legs 5 and 10 are pivotally connected to each other through the medium of a rod 12 to provide the scissor-type retractable running gear just referred to. Springs 9' attached to the rod 9 and to the forward end of the body 1 serve to retract the running gear by drawing the rod 9 forwardly in the slots 8 in a manner which will be readily understood. The lower edges of the rear portions of the side walls 2 may be provided with notches 13 to receive a cross-bar 14 on which the wheels 11 are rotatably mounted; and the body portion, as a whole, is adapted to support any type of basket 15 for receiving groceries and the like.

Pivotally mounted on a rod 16 fixed to the forward ends of the side walls 2 is an arm 17, which is provided with upwardly directed ratchet teeth 18 on its rear portion adapted to cooperate with the rod 9 which is slidably mounted in slots 8 of the side walls 2 of the body portion of the cart. The forward end of the arm 17 carries a pair of wheels 19 mounted on an axle 20, and the ratchet 18 carried by the arm 17 is normally held in contact with the rod 9 by means of a tension spring 21 attached to the undersurface of the part 3 of the body 1. In order to prevent inadvertent movement of the arm 17 about the fixed rod 16, a pin 17' may be inserted through an aperture formed in the arm and in fixed rod 16 on which the arm 17 is pivoted. This structure is best illustrated in FIGURE 3a. If it is desired to make the pin 17' a captive member, it may be attached to one end of a chain or the like 17a whose other end is attached to arm 17 in any suitable manner.

A handle for operating the cart is of T-formation, having a leg 22 and cross-bar 23. This handle is removable so that it may be mounted in either of two positions, namely, that shown in FIG. 1 in which the leg portion 22 is shown as disposed in bracket 24 mounted on the end wall 4 of the body portion of the cart, or that shown in FIG. 2 wherein the leg 22 is shown as slid into a bracket 25 mounted on the under side of the plate 3 of the body 1. The leg 22 is preferably provided with a series of apertures for receiving a pin 22' for adjustably mounting the handle in the bracket 24.

As heretofore indicated, the arm 17 and the rod 9 serve to lock the retractable running gear in either of two positions, and by reason of the forward end of the arm 17 and its wheels 19, the unlocking of the running gear is rendered automatic, as clearly indicated in FIG. 1, wherein the rear end of the body of a station wagon or the trunk of a sedan, indicated by the letter A, is disposed slightly above the position of the forward end of the locking arm 17. Therefore, when the operator desires to place the cart, with or without its contents, into the vehicle, the cart is tilted slightly upward upon its rear wheels 11, so that the wheels 19 may be projected forwardly into the part A of the carrying vehicle. A portion of the weight of the cart and its cargo is then allowed to rest upon the part A of the vehicle so as to move the arm 17 about its pivot and cause the spring 21 to be extended, thereby releasing the ratchet and permitting the springs 9' to draw the rod 9 forwardly, and causing legs 5 and 10 to rotate about their pivot 12 so as to retract wheels 7 and 11 into the dotted-line positions shown in FIG. 1. Thereafter, the cart may be rolled forwardly into the station wagon, or the trunk of a sedan, as the case may be, by lifting the rear end of the cart by means of the handle 23. In this connection, it is to be noted that the handle 23, during this operation, is positioned in the manner shown in FIG. 1, so that in the event that the retractable running gear should be inadvertently operated, the leg 22 will serve to temporarily support the cart in a safe position. After the cart is projected forwardly toward its final position within the vehicle, the handle 23 may be removed from the bracket 24 and the leg 22 passed through hole 4' of the body into the bracket 25 in the under side of the cart body 1, as indicated in FIG. 2, and the cart is then moved into final position within the vehicle A. By reversing the steps just outlined, the cart may be removed from the vehicle A and put to its intended use in the usual manner.

From the foregoing description taken in connection with the accompanying drawings, it will be apparent that I have devised a relatively simple arrangement of wheeled shopping cart which may be readily carried in collapsed condition in the rear of a sedan or station wagon, and that the retraction of the wheels is rendered automatic by a very slight manipulation of the cart itself.

In accordance with the patent statutes, I have described what I now consider to be the preferred form of the invention, but since various minor changes may be made in structural details without departing from the spirit of the invention, it is intended that all such changes be included within the scope of the appended claims.

I claim:

1. A cart comprising a body portion including a frame having a fixed rod at one end thereof, retractable running gear including crossed movable supporting legs and a movable rod connecting the same on which the body is mounted, an arm pivoted to the fixed rod intermediate the ends of the arm, means on one end of the arm and engageable with said movable rod for locking the running gear in operative position, a wheel mounted on the opposite end of the arm and adapted to engage the floor of an automobile or the like to rock the arm and release the running gear, and spring means for automatically moving the running gear to retracted position upon release of the said running gear by said arm.

2. A cart comprising a body portion, retractable running gear on which the body is mounted, an arm pivoted intermediate its ends to the body, ratchet teeth on the inner end of the arm adapted to interlock with the running gear to lock it in operative position, spring means normally retaining the ratchet in locking position, a wheel on the outer end of the arm adapted to engage the floor of an automobile to rock the arm and release the running gear when the cart is tilted forwardly to bring a portion of the load onto the wheel, and spring means for automatically moving the running gear to retracted position upon release of the said running gear.

3. A cart comprising a body portion, scissor-type retractable running gear on which the body is mounted, an arm pivoted intermediate its ends to the body, ratchet teeth on the inner end of the arm adapted to engage a portion of the running gear and lock the same in operative position, a tension spring connected to the body and to the arm for normally retaining the ratchet in locking position, means on the outer end of the arm for engaging the floor of an automobile to rock the arm and release the running gear when the cart is tilted forwardly to bring a portion of the load onto the forward end of the arm, and spring means for automatically moving the running gear to retracted position upon release of the said running gear.

4. A cart comprising a load carrying body, collapsible scissor type running gear including opposed pairs of legs interconnected for pivotal movement between collapsed and extended load bearing positions, means for connecting said legs to said body including structure to accommodate for the relative movement between said body and legs incident to movement of said legs between collapsed and extended positions, means for biasing said legs to collapsed position, trippable latching means releasably to lock said collapsible legs at predetermined positions of extension or collapse having a part which projects relative to one end of said cart, means for biasing said latching means to latching position with a force less than the weight of said cart, said latching means being trippable by shifting said cart to impose the weight of the said end of said cart on the projecting part of said latching means, and a wheel on the projecting end of said latching means to support the said end of said cart for rolling movement upon a supporting surface when said legs are collapsed.

5. A cart according to claim 4, wherein a T-shaped handle member is detachably connected to the load carrying body and extends wholly in substantially a vertical plane at a right angle to the plane of said body when said handle member is in a position of use, and wherein said handle member extends wholly in a plane substantially parallel to the plane of said body when disposed in an out-of-use and out-of-the-way position.

6. A cart comprising a load carrying body including a frame having a fixed rod at one end thereof and opposed longitudinal slots in the opposite side members of said frame, collapsible scissor-type running gear including opposed pairs of legs interconnected for pivotal movement between collapsed and extended load bearing positions, means for connecting said legs to said body including structure to accommodate for the relative movement between said body and legs incident to movement of said legs between collapsed and extended positions, said structure including a transverse rod movable in said pair of slots lengthwise of said side members and to which one of the legs of each pair is connected, means for biasing said legs to collapsed position, rockable latching means carried by said fixed rod and engageable with said movable transverse rod releasably to lock said collapsible legs at predetermined positions of extension or collapse, and means for biasing said latching means to latching position with a force less than the weight of said cart.

7. A cart comprising a load carrying body including a frame having opposite side members and a fixed rod at one end thereof and also having opposed longitudinal slots in said opposite side members, collapsible scissor-type running gear including opposed pairs of legs interconnected for pivotal movement between collapsed and extended load bearing positions, means for connecting said legs to said body including structure to accommodate for the relative movement between said body and legs incident to movement of said legs between collapsed and extended positions, said structure including a transverse rod movable in said pair of slots lengthwise of said side members and to which one of the legs of each pair is attached, means for biasing said legs to collapsed position, trippable latching means carried by said fixed rod and engageable with said movable transverse rod releasably to lock said collapsible legs at predetermined positions of extension or collapse having a part which projects relative to one end of the cart, and means for biasing said latching means to latching position with a force less than the weight of said cart, said latching means being trippable by shifting said cart to impose the weight of the said end of said cart on the projecting part of said latching means.

References Cited in the file of this patent

UNITED STATES PATENTS

| | | |
|---|---|---|
| 857,696 | Weinstein | June 25, 1907 |
| 1,785,646 | Pascoo | Dec. 16, 1930 |
| 2,378,931 | Kiesow | June 26, 1945 |
| 2,395,208 | Wylie | Feb. 19, 1946 |
| 2,492,676 | Zajicek | Dec. 27, 1949 |
| 2,531,856 | Marcouiller | Nov. 28, 1950 |
| 2,877,047 | Weil | Mar. 10, 1959 |
| 2,881,007 | Karwatt et al. | Apr. 7, 1959 |
| 2,958,873 | Ferneau | Nov. 8, 1960 |